United States Patent
Zruya et al.

(10) Patent No.: US 10,332,401 B2
(45) Date of Patent: Jun. 25, 2019

(54) RUNNING VEHICLE ALERTING SYSTEM AND METHOD

(71) Applicant: FORESIGHT AUTOMOTIVE LTD., Ness Ziona (IL)

(72) Inventors: Levi Zruya, Jerusalem (IL); Haim Siboni, Lod (IL)

(73) Assignee: Foresight Automotive Ltd., Ness Ziona (IL)

( * ) Notice: Subject to any disclaimer, the term of this patent is extended or adjusted under 35 U.S.C. 154(b) by 0 days.

(21) Appl. No.: 16/078,489

(22) PCT Filed: Mar. 6, 2017

(86) PCT No.: PCT/IL2017/050272
§ 371 (c)(1),
(2) Date: Aug. 21, 2018

(87) PCT Pub. No.: WO2017/153979
PCT Pub. Date: Sep. 14, 2017

(65) Prior Publication Data
US 2019/0035276 A1    Jan. 31, 2019

(30) Foreign Application Priority Data

Mar. 6, 2016 (IL) .......................................... 244462
Apr. 21, 2016 (IL) .......................................... 245279

(51) Int. Cl.
G08B 1/00 (2006.01)
G08G 1/16 (2006.01)
(Continued)

(52) U.S. Cl.
CPC ............... *G08G 1/162* (2013.01); *G06K 9/00* (2013.01); *G06K 9/00818* (2013.01);
(Continued)

(58) Field of Classification Search
CPC .............. G08B 1/162; B60Q 9/00; B60R 1/00
(Continued)

(56) References Cited

U.S. PATENT DOCUMENTS 8,111,289 B2    2/2012  Zruya
8,761,991 B1    6/2014  Ferguson
(Continued)

OTHER PUBLICATIONS

International Preliminary Report on Patentability for PCT/IL2017/050272, dated Jul. 11, 2018 (18 pages).
(Continued)

*Primary Examiner* — Tai T Nguyen
(74) *Attorney, Agent, or Firm* — Roach Brown McCarthy & Gruber, P.C.; Kevin D. McCarthy

(57) ABSTRACT

A running vehicle alerting system, comprising one or more forwardly directed optical sensors mounted on a same vehicle which are configured to capture road related images; an image processing unit configured to analyze the captured road-related images in real time and to determine, based on the analyzed images, whether the vehicle on which the one or more optical sensors are mounted is to be considered as a running vehicle that is spaced from a traffic light or a traffic sign by a distance shorter than a threshold safe braking distance and that is liable to endanger other vehicles; and an alert signal generating unit responsive to the determination of the vehicle as a running vehicle, for generating a collision avoiding alert signal.

22 Claims, 7 Drawing Sheets

(51) Int. Cl.
*G06K 9/00* (2006.01)
*G08G 1/0962* (2006.01)
*H04W 4/02* (2018.01)
*H04W 4/44* (2018.01)
*G08G 1/0965* (2006.01)

(52) U.S. Cl.
CPC ....... *G06K 9/00825* (2013.01); *G08G 1/0965* (2013.01); *G08G 1/09623* (2013.01); *G08G 1/164* (2013.01); *G08G 1/166* (2013.01); *H04W 4/023* (2013.01); *H04W 4/44* (2018.02)

(58) Field of Classification Search
USPC ................. 340/902, 903, 905, 907, 935–937
See application file for complete search history.

(56) References Cited

U.S. PATENT DOCUMENTS

| | | | |
|---|---|---|---|
| 9,092,986 B2 | 7/2015 | Salomonsson | |
| 9,111,453 B1* | 8/2015 | Alselimi | ............ G06K 9/00785 |
| 2003/0112132 A1 | 6/2003 | Trajkovic | |
| 2011/0095908 A1* | 4/2011 | Nadeem | ................... B60H 3/00 |
| | | | 340/905 |
| 2014/0156157 A1* | 6/2014 | Johnson | ................... B60T 7/22 |
| | | | 701/70 |

OTHER PUBLICATIONS

International Search Report for PCT/IL2017/050272, dated Jun. 13, 2017 (3 pages).
Written Opinion of the International Searching Authority for PCT/IL2017/050272, dated Jun. 13, 2017 (5 pages).

\* cited by examiner

RUNNING VEHICLE ALERTING SYSTEM AND METHOD

FIELD OF THE INVENTION

The present invention relates to the field of traffic safety. More particularly, the invention relates to a system and method for providing alerts for avoiding car accidents, resulting from failure of a running vehicle to stop at a red light or at a traffic sign, falling asleep or losing concentration.

BACKGROUND OF THE INVENTION

Many traffic accidents result from the inability of drivers to view the state of a traffic light, e.g. whether the traffic light indicates a red light, due to sun glare, poor visibility such as during a snow storm, or driver drowsiness. Other accidents are caused due to running a red light, which is one of the most common moving violations (especially most popular when police officers must meet their ticket quotas for the month). It would be desirable to display a visible alert to a driver that is indicative of the state of a traffic light being approached at a relatively high speed.

Some other risky scenarios may happen when the driver cannot clearly see road signs.

All the existing methods have not yet provided satisfactory solutions to the problem of detecting dangerous scenarios of impending collisions between vehicles or between a vehicle and an object (which is considered to be an obstacle), due to running a red light or a stop sign. Therefore, a system which is capable of identifying and preventing such risky scenarios is highly desired.

It is therefore an object of the present invention to provide a system for providing an indication of the state of a traffic light.

It is an additional object of the present invention to provide a system for providing a dearly visible indication of the state of a traffic light, which is not influenced by the instantaneous weather conditions.

It is an additional object of the present invention to provide a system and method for generating a visible or audible alert which causes a driver to react immediately in response to identification of a nearby vehicle that has run, or is about to run, a red light or traffic sign.

It is yet an additional object of the present invention to provide a method and system for continuously and automatically detecting dangerous scenarios of impending collisions between vehicles or between a vehicle and a stationary or moving object, due to failure to stop at a red light.

Other objects and advantages of this invention will become apparent as the description proceeds.

SUMMARY OF THE INVENTION

The present invention is directed to a running vehicle alerting system, comprising one or more forwardly directed optical sensors mounted on a same vehicle which are configured to capture road-related images; an image processing unit configured to analyze the captured road-related images in real time and to determine, based on the analyzed images, whether the vehicle on which the one or more optical sensors are mounted is to be considered as a running vehicle that is spaced from a traffic light or a traffic sign by a distance shorter than a threshold safe braking distance and that is liable to endanger other vehicles; and an alert signal generating unit responsive to the determination of the vehicle as a running vehicle, for generating a collision avoiding alert signal.

In one embodiment, the image processing unit and the alert signal generating unit are locally mounted on the running vehicle and the generated signal is a vehicle-originated alert signal.

In one aspect, the image processing unit is configured to estimate an instantaneous distance between the vehicle and the traffic light or traffic sign in response to analysis of pixels of the captured road-related images and to derive an instantaneous speed of the vehicle from a vehicle-mounted speed detection device, the threshold safe braking distance being a function of the estimated instantaneous distance and the derived instantaneous speed.

In one aspect, the image processing unit is configured to estimate an instantaneous distance between the vehicle and the traffic light or traffic sign by comparing the size of the traffic light or traffic sign to stored templates, each of which reflecting the size of the traffic light or traffic sign at a known distance, and determining a size reduction or enlargement.

In one aspect, the image processing unit is configured to determine a state of the traffic light based on the analyzed images, the threshold safe braking distance also being a function of the determined traffic light state.

In one aspect, the alert signal is a driver-receptive sensory alert to indicate to a driver of the running vehicle that a braking force must be urgently applied. The driver-receptive sensory alert may be a visual alert or an audible alert.

In one aspect, the alert signal generating unit comprises a controller and a digital projector in communication with the controller, the projector configured to cause a predetermined message that is stored in a memory device of the controller and constituting the visual alert to be displayed. The projector is configured to project an image of the predetermined message onto a dashboard, a front window of the vehicle, or a vehicle-mounted media screen.

In one aspect, the alert signal generating unit comprises a signal generator, a transmitter in data communication with the signal generator for transmitting the alert signal to a receiver of another vehicle which is in transmission range of the transmitter, to indicate to a driver of the another vehicle that a braking force must be urgently applied.

In one aspect, the alert signal is transmitted using a short-range communication format that is received by a smartphone of the driver of the another vehicle.

In one embodiment, the system further comprises a remote server configured with a server-mounted alert signal generating unit, the remote server being in data communication with the alert signal generating unit of the running vehicle and with the receiver of a plurality of another vehicles, wherein the vehicle-originated alert signal is transmittable from the running vehicle to the server following determination of the vehicle as a running vehicle, whereupon a server-originated alert signal is transmittable from the server to one or more additional vehicles found to be separated from the running vehicle by less than a collision-liable distance.

In one embodiment, the system further comprises a plurality of cellular-assisted and location-indicative vehicle units each of which built-in to a different one of a plurality of vehicles including the running vehicle and the other vehicles, and one or more cellular base stations operable to transmit location data of the plurality of vehicle units to the server.

In one embodiment, the system further comprises a remote server comprising the image processing unit, the alert signal generating unit and a database in which map data representative of the physical layout of a plurality of inspected areas is stored; a plurality of cellular-assisted and location-indicative units carried by a different one of a plurality of vehicles including the running vehicle; and one or more cellular base stations operable to transmit location data of the plurality of cellular-assisted units to the server, wherein the image processing unit is configured to analyze the captured road-related images in real time and to identify a traffic light or a traffic sign being approached by each of the vehicles carrying a corresponding cellular-assisted unit, wherein the server is operable to process the map data and the transmitted location data for a given inspected area and to determine, for each of the vehicles located within the inspected area, an instantaneous distance between the vehicle and the traffic light or traffic sign and an instantaneous vehicular speed, and a decision as to whether it should considered as a running vehicle, the threshold safe braking distance being a function of the instantaneous distance and the instantaneous speed, wherein the alert signal generating unit is operable to transmit a generated alert signal, based on the processed map data and location data, to the vehicles found to be separated from the running vehicle by less than a collision-liable distance.

In one aspect, the inspected area is selected from the group consisting of an area that includes a traffic light, an area that includes a traffic sign, an area that includes a stop line, an area that includes all lanes leading to a stop line, an area that includes a junction area delimited by all adjacent stop lines, and an area that includes a railroad crossing.

In one aspect, each of the cellular-assisted units is built-in to the corresponding vehicle by which it is carried.

In one aspect, the alert signal is a driver-receptive sensory alert to indicate to a driver of the vehicles found to be separated from the running vehicle by less than a collision-liable distance that a braking force must be urgently applied.

In one aspect, the one or more optical sensors or the image processing unit are implemented by a smartphone.

The present invention is also directed to a method for alerting neighboring vehicles following identification of a running vehicle, comprising the steps of capturing road-related images by one or more forwardly directed optical sensors mounted on a same vehicle; by an image processing unit in data communication with the one or more optical sensors, analyzing the captured road-related images in real time to identify a traffic light or a traffic sign being approached by the vehicle; determining, by a processor in data communication with the image processing unit, an instantaneous distance between the vehicle and the traffic light or traffic sign and an instantaneous vehicular speed, and a decision as to whether the vehicle should be considered as a running vehicle that is spaced from the traffic light or traffic sign by a distance shorter than a threshold safe braking distance and that is liable to endanger other vehicles, the threshold safe braking distance being a function of the instantaneous distance and the instantaneous speed; if the vehicle has been determined to be a running vehicle, transmitting a wireless alert signal to a receiver of each of one or more vehicles neighboring the running vehicle, to indicate to a driver of each of the neighboring vehicles that a braking force must be urgently applied or that any other evasive action must be taken.

The processor may be operable to decide that the vehicle should be considered as a running vehicle when spaced from the traffic light or traffic sign by a distance shorter than a predetermined value and the vehicle has not yet reduced its speed, or has not yet reduced its speed by more than a predetermined deceleration rate.

In one aspect, a remote server determines a location of each of the one or more vehicles neighboring the running vehicle and transmits the alert signal to each of the one or more vehicles neighboring the running vehicle.

The image processing unit may use Artificial Intelligence techniques to identify traffic lights or traffic signs.

DETAILED DESCRIPTION OF PREFERRED EMBODIMENTS

The present invention is a system and method for continuously and automatically detecting dangerous scenarios of impending collisions between vehicles or between a vehicle and an object, due to a moving violation such as failure to stop at a red light, or to unawareness. The system comprises one or more optical sensors such as a camera, an image processing unit described for example in U.S. Pat. No. 8,111,289 and copending Israeli Patent Applications Nos. 243413 and 244046, and an alert signal generating unit responsive to the determination of a vehicle that will run a red light or will endanger other vehicles due to another type of moving violation. Alternatively, the optical sensor may be embodied as horizontally or vertically deployed 2-D cameras with an overlapping part of their field of view. Each optical sensor is installed on a vehicle and is capable of providing 2-D or effective three-dimensional (3-D) data, based on image analysis. In case of 3-D data, image analysis may include an overlapping field of view, which is aimed forwardly and/or backwardly. This data is analyzed in real time and can provide an accurate estimation of the distance, size, movement direction and speed of any vehicle within the overlapping field of view.

Figure 1:
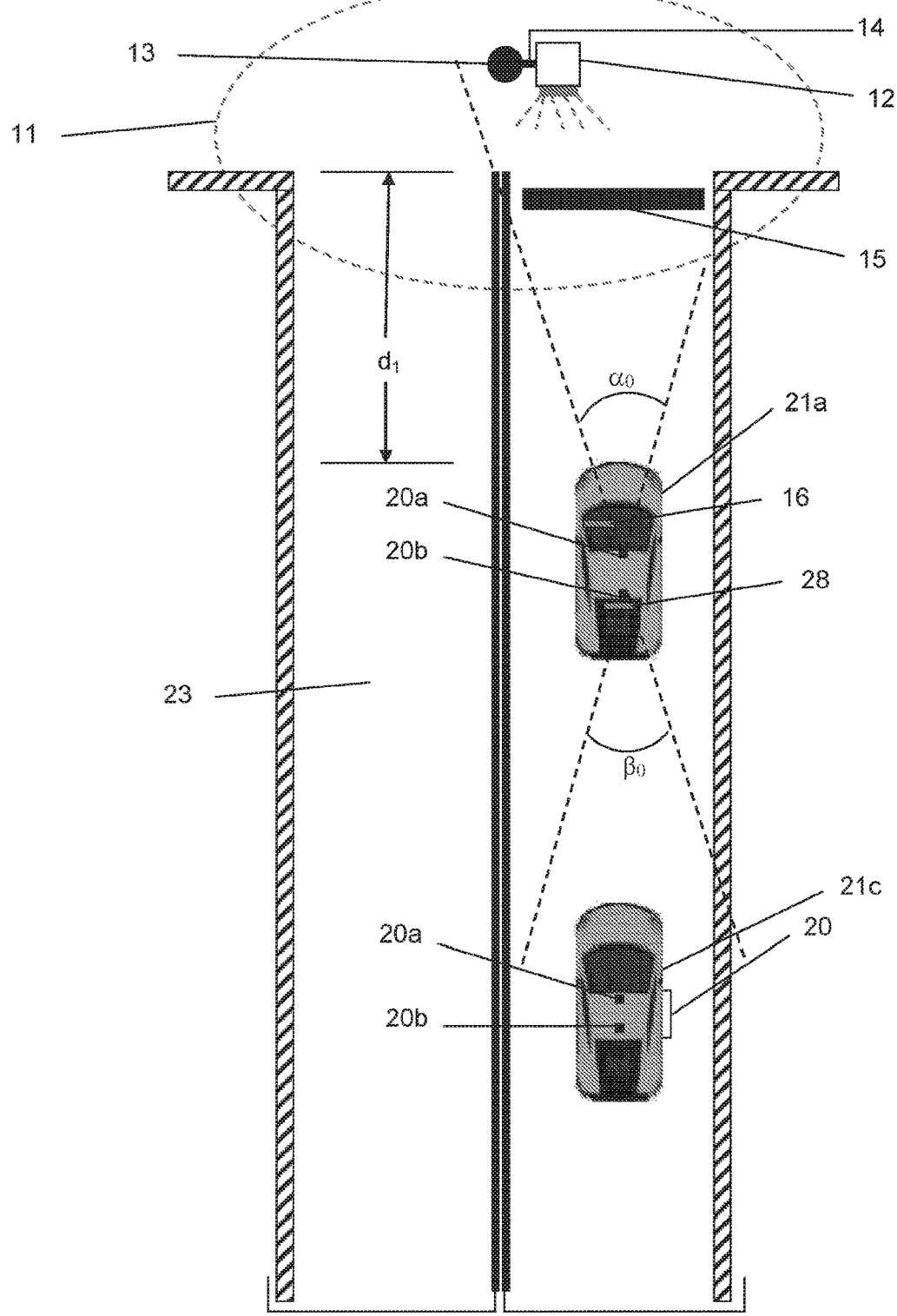
FIG. 1 is a schematic illustration of an implementation of an apparatus for detecting dangerous scenarios of impending collisions between a vehicle that is going to run a red light, according to an embodiment of the invention.

FIG. 1 schematically illustrates an implementation of an apparatus for detecting dangerous scenarios of impending collisions between a vehicle that is about to run a red light, according to an embodiment of the invention. In this example, the apparatus 20 comprises single optical sensors 20a and 20b, a processor (not shown) for processing the images acquired by optical sensors 20a and 20b and a transceiver (not shown) for transmitting wireless alert signals. Optical sensors 20a and 20b are installed on a vehicle 21a, moving along a lane 22b of a road 23 with two lanes 22a and 22b. Optical sensor 20a is directed forwardly and includes a single camera 16 with a field of view $\alpha_0$. Optical sensor 20b is directed rearwardly and includes a single camera 28 with a field of view $\beta_0$.

In this scenario, vehicle 21a moves along lane 22b toward a junction 11, which includes a traffic light 12 that is installed on a stationary post 13 via arm 14. Traffic light 12 is covered by sector $\alpha_0$ of optical sensor 20a and vehicle 21c, which moves behind vehicle 21a is covered by sector 13o of optical sensor 20b.

Normally, in the case that traffic light 12 is red, vehicle 21a should reduce its speed when approaching junction 11 and stop before reaching stop line 15. However, in the scenario of FIG. 1, the traffic light 12 is red and the driver of vehicle 21a, who is not aware of the red light or ignores it, has not reduced its speed and is going to enter the region of junction 11 and run the red light. In this case, optical sensor 20a continuously or intermittently measures or estimates the instantaneous distance d1 between vehicle 21a and stop line 15. For any speed of vehicle 21a, apparatus 20 calculates a minimal threshold safety distance that is required for allowing vehicle 21a to stop before the stop line 15. The minimal threshold safety distance is based on the instantaneous speed of vehicle 21a, and apparatus 20 may derive its instantaneous speed from the speedometer of vehicle 21a with which it is in data communication or from a smartphone positioned within the interior of vehicle 21a.

Identification of an illuminated red light may be carried out using image processing techniques, using the fact that the image pattern and dimensions of a traffic light are standard in each country and therefore, may be compared to a template that will be stored in a memory of apparatus 20. For example, there is a standard for the layout of the traffic light, the size of each illuminating color, the spacing between colors and the order of colors. It is well known that the red light spot is uppermost, the yellow light spot is in the middle and the green light spot is lowermost. Therefore, an illuminated red light may be detected by comparing the intensity and contrast of the uppermost spot to the background and the other spots.

In the case when apparatus 20 comprises single optical sensors 20a and 20b, for example smartphones, the acquired view is 2-D and the distance d1 can be estimated by comparing the total size of traffic light to stored templates, each of which reflecting the size at a known distance. It is clear that the total size of the traffic light (which can be identified by a typical object) will be smaller if the distance d1 is larger. Therefore, apparatus 20 can measure the total size reduction/enlargement and estimate the distance d1.

In the case when apparatus 20 comprises two optical sensors with overlapping fields of view which are aimed forwardly, effective 3-D data is obtained. Image analysis may be analyzed in real time and can provide an accurate estimation of the distance and size of the traffic light. Therefore, apparatus 20 can estimate the distance d1 more accurately.

The minimal threshold safety distance is continuously updated according to the speed of vehicle 21a. Upon detecting that the distance d1 is below the threshold, apparatus 20 automatically transmits an alert signal by means of processor-activated alert circuitry to the driver of vehicle 21a with an indication that the current distance d1 is shorter than the safe braking distance of vehicle 21a at the current speed and that he should reduce speed to avoid running the red light. The alert signal may be visual, for example, in the form of a message that is displayed on the front window of the vehicle and/or on the smartphone of the driver. If for example, the driver is not aware of the red light since he is interacting with his smartphone, he will see a bursting alert message on the display of his smartphone. The alert signal may also be accompanied with an audio alert.

Upon detecting that vehicle 21a is about to run the red light, i.e. distance d1 is shorter than the safe braking distance of vehicle 21a, apparatus 20 automatically transmits an alert signal to vehicle 21c with an indication that a vehicle may reach the junction with a high potential of collision with vehicles arriving from other directions. The signal is received by a receiver in apparatus 20 of vehicle 21c, which provides a visual alert to the driver of vehicle 21c. This allows the driver of vehicle 21c to start braking or at least to reduce speed, even though the driver of vehicle 21c cannot see any braking lights of vehicle 21a. This reduces the risk of a collision between vehicles 21a and 21c.

Figure 2:
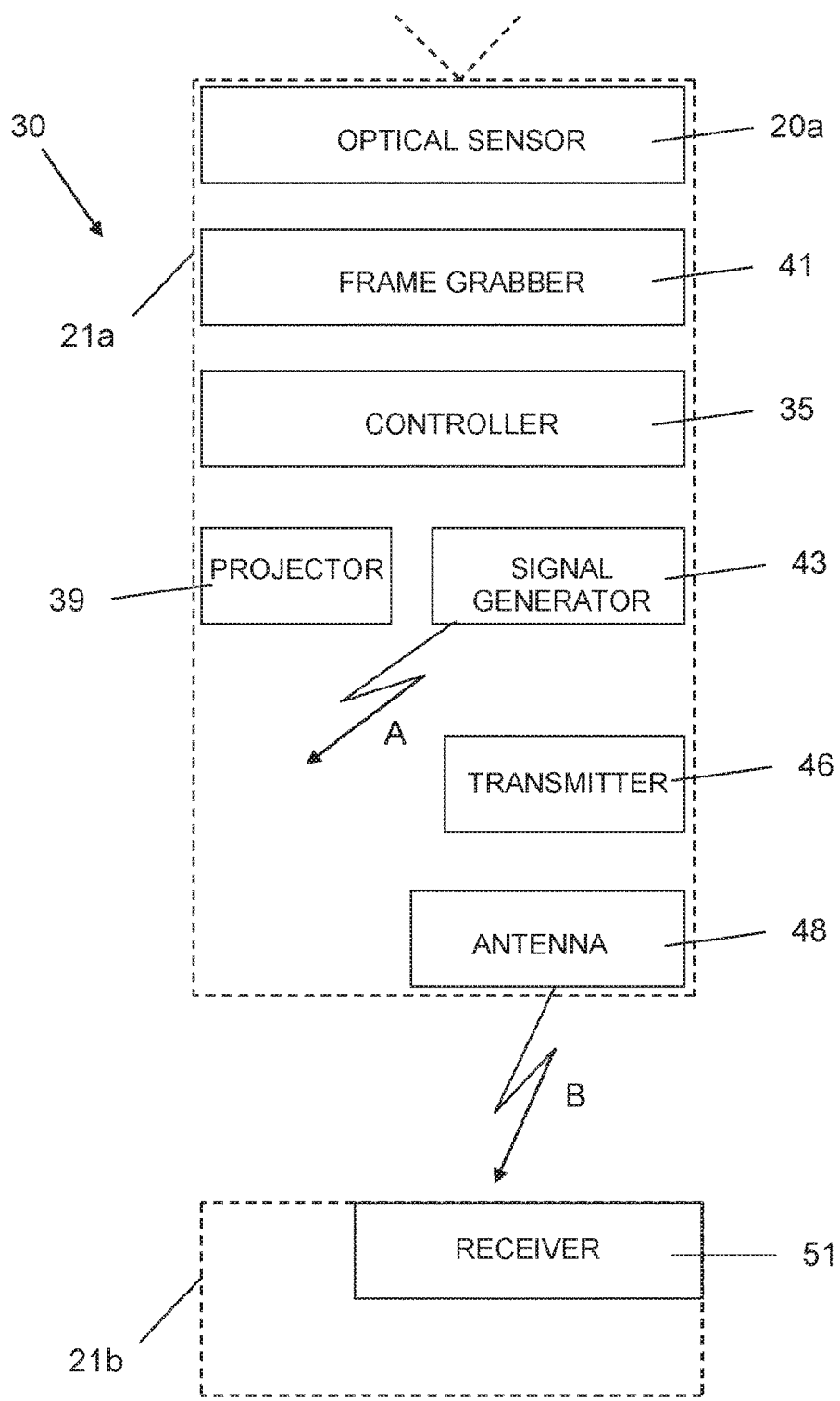
FIG. 2 is a schematic illustration of an alerting system usable in conjunction with the apparatus of FIG. 1.

Alerting system 30 usable in conjunction with apparatus 20 of FIG. 1 is illustrated in FIG. 2. System 30 comprises a local image processing unit, including forward optical sensor 20a, frame grabber unit 41 for digitizing the images captured by optical sensor 20a with respect to the traffic light, and controller 35 for processing the digitized data according to stored instructions. A signal generator 43 in data communication with controller 35 is activated to generate alert signal A when controller 35 determines in accordance with the processed data that the forwardly positioned vehicle 21a is spaced from the stop line of the first to be approached junction by a distance that is shorter than the threshold safe braking distance. The generated alert signal A may be a visual alert in the form of an icon or a suitable pop-up message that is displayable to the driver of vehicle 21a, for example on its dashboard, on an in-vehicle communication device or on the driver's smartphone. Alternatively, the generated alert signal A may be an audible alert that can be heard within vehicle 21a, to indicate to the driver that a braking force must be urgently applied to minimize or to avoid the impact of a collision that is liable to inflicted to other vehicles located within the first to be approached junction.

The visual alert may be displayed by means of a digital projector 39 in communication with controller 35, in response to the generation of wireless alert signal A. Projector 39, which may be mounted in a central region of vehicle 21a, or in any region thereof rearward of the dashboard, projects an image of a predetermined message that is stored in the memory of controller 35 onto the dashboard or onto a vehicle-mounted media screen. Alternatively, projector 39 is configured to inject the predetermined message into the user interface that is displayable on the media screen, or is integrated with the on-board computer so that a corresponding icon will be displayed on the dashboard.

Signal generator 43 is also operable to transmit a wireless signal B rearwardly to the rearwardly positioned vehicle 21c by means of transmitter 46 in communication with signal generator 43 and directional antenna 48 in communication with transmitter 46. A receiver 51 in the rearwardly positioned vehicle 21c receives wireless signal B, and a visual or audible alert is generated in response to the received signal, similar to the generation of alert signal A.

Directional antenna 48 mounted on vehicle 21a ensures that the generated wireless alert signal B will be reliably transmitted to receiver 51 mounted in the rearwardly positioned vehicle 21c, which is in need of being urgently braked in order to avoid a collision with forwardly positioned vehicle 21a, but not to a receiver mounted in a laterally spaced positioned vehicle, which would unduly slow traffic flow and could even cause an accident if an unwarranted braking force were applied thereby. Wireless alert signal B may be an infrared signal. Alternatively, wireless alert signal B may be a Wi-Fi signal and receiver 51 may be associated with a dedicated vehicular Wi-Fi hotspot, and may have sufficient signal strength to facilitate transmission to one or more vehicles positioned behind vehicle 21c, so as to prevent a multiple vehicle collision, such as a chain accident.

Controller 35 may transmit the predetermined message using BlueTooth protocol or any other short-range communication format to the driver's smartphone, on which is installed a dedicated application that is adapted to display the message on the smartphone's screen or to convert the generated alert signal A into a visible or audible indication. Since the range of Bluetooth is limited, the dedicated application may be configured to re-transmit the received signal, thereby forming a wireless communication path between following vehicles.

Figure 3:
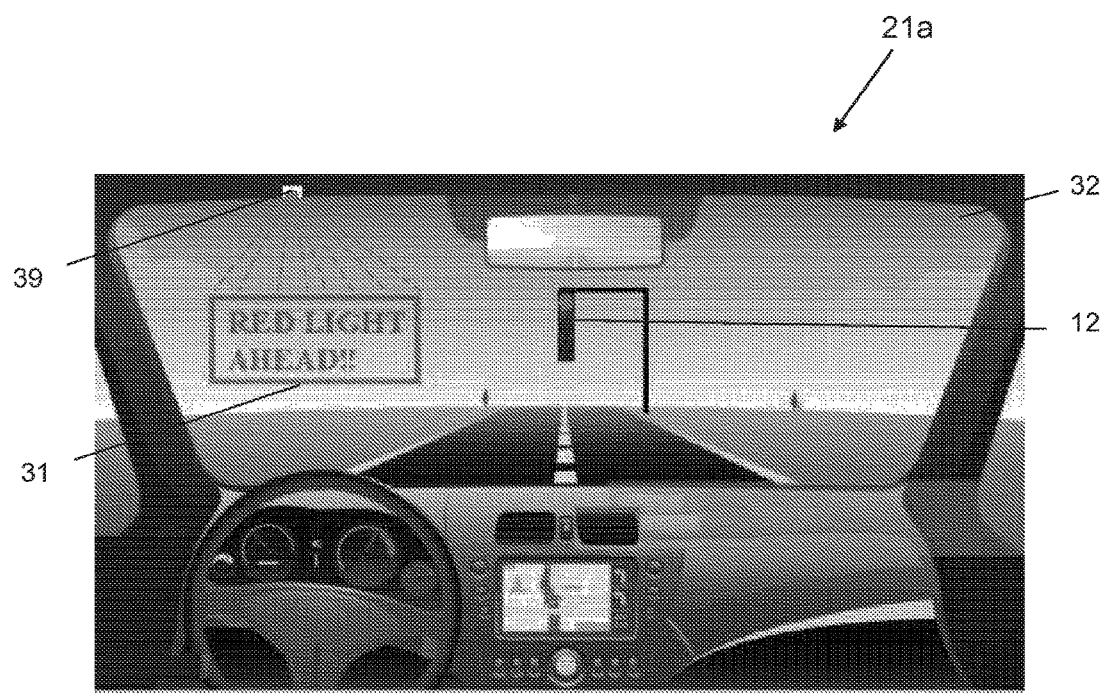
FIG. 3 is a schematic illustration of an implementation of providing a visual alert to the driver of a vehicle that is going to run a red light.

FIG. 3 schematically illustrates an implementation of providing a visual alert to the driver of a vehicle 21a that is about to run a red light of traffic light 12. In this example, the apparatus detects a dangerous scenario of impending collision between vehicle 21a and other vehicles that have already entered, or about to enter, the junction area 11. In response, the alerting system transmits a generated alert signal to a receiver mounted in vehicle 21a, which in turn causes projector 39 to project a stored visual alert 31, for example in the form of visible red letters, on the windshield 32 of vehicle 21a. An exemplary projected visual alert 31 may include a message such as "RED LIGHT AHEAD" or an icon which will attract the attention of the driver.

According to a further embodiment, the alert signal (which may be transmitted using BlueTooth protocol (or any other short-range communication format) may be received by the smartphone of each driver in the vicinity of the junction 11, where a dedicated application installed on the smartphone will convert the signal into a visible or audible alert.

It should be indicated that the traffic light may be located in a crossing of the road with railroad, to warn drivers that are approaching the crossing about an upcoming train.

Figure 4:
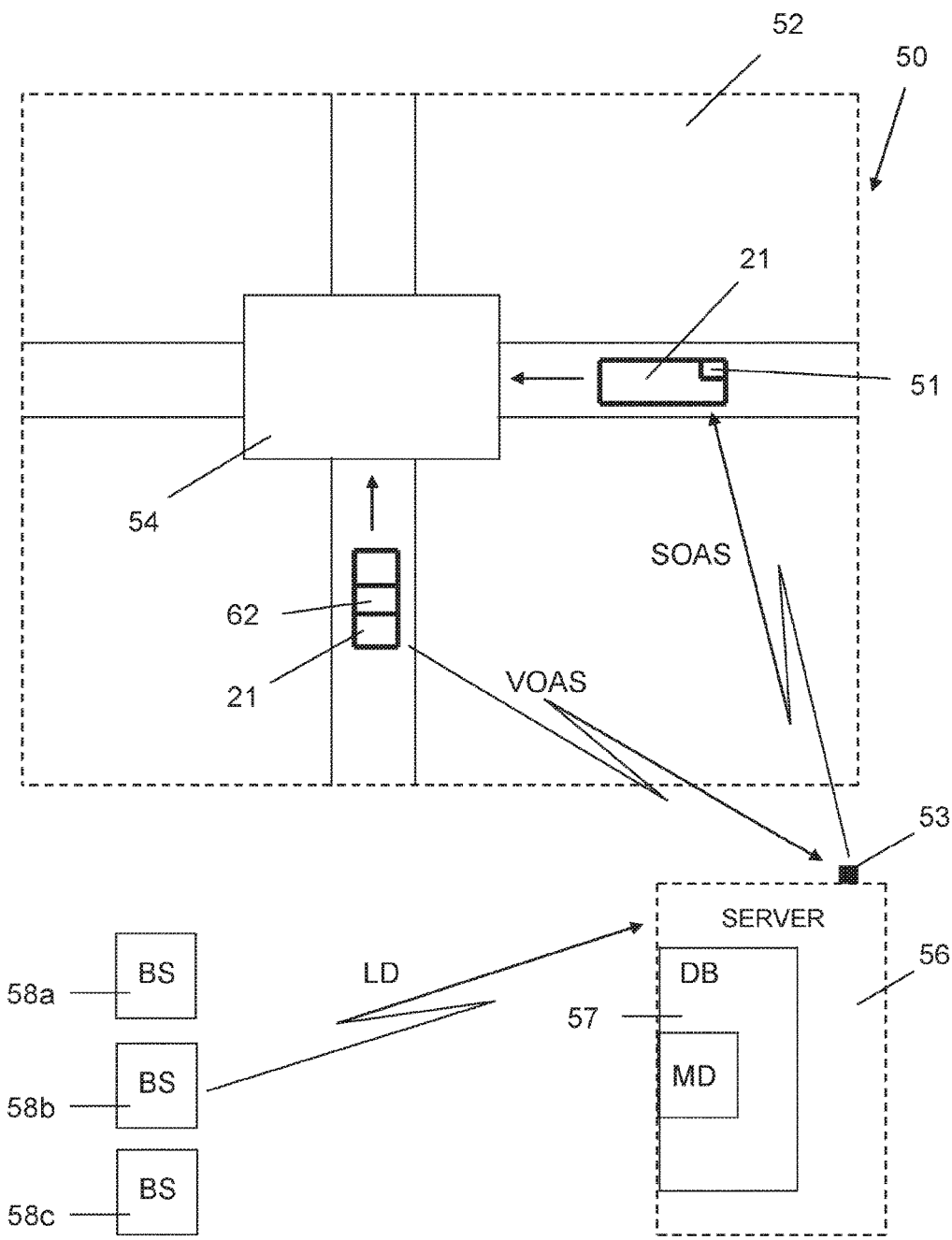
FIG. 4 is a schematic illustration of an alerting system according to another embodiment of the invention.

According to another embodiment illustrated in FIG. 4, alerting system 50 comprises remote server 56 which continuously receives from the base stations (BS), e.g. base stations 58a-c, of various cellular networks, wired or wireless signals that are representative of the location data (LD) of all cellular-assisted vehicle units 62 in the vicinity of one or more inspected areas 52, such as one that includes a road junction area 54. The location data may be derived from call records, or may be established in other ways. The location data is updated at a sufficiently high frequency, for example once every half a second, which allows server 56 to calculate an instantaneous speed and an instantaneous travel direction for each monitored vehicle. Remote server 56 may also comprise a database (DB) 57 in which map data (MD) of a plurality of inspected areas is stored. The map data represents the physical layout of the corresponding inspected area, including the relative location of a traffic light or traffic sign, stop line, all lanes leading to a stop line, and a junction area delimited by all adjacent stop lines. Remote server 56 processes the received LD and MD for a given inspected area, and determines whether a server-originated alert signal (SOAS) should be transmitted to one or more vehicles 21. If determined to be necessary, an SOAS is transmitted from the transceiver 53 of server 56 to a receiver 51 of each vehicle 21. A multiplexer may be employed to simultaneously transmit the SOAS to a plurality of vehicles.

To promote public safety, regulatory agencies may require each base station to transmit the location data of the vehicle units in the vicinity of an inspected area 52 to one or more servers 56 associated with alerting system 50, as well as require each motor vehicle 21 to be equipped with a built-in vehicle unit 62 in order to accurately generate and transmit a vehicle-originated alert signal (VOAS) which is indicative that a braking force must be urgently applied to minimize or to avoid the impact of a collision with a red light or traffic sign running vehicle (hereinafter a "running vehicle"). Vehicle unit 62 is accordingly able to communicate with server 56 and to transmit thereto the VOAS, and may comprise a screen on which a visual alert is displayable. If so desired, vehicle unit 62 may be in short-range communication with a smartphone or any other mobile device, to allow for example the visual alert to be displayed thereon.

Figure 5:
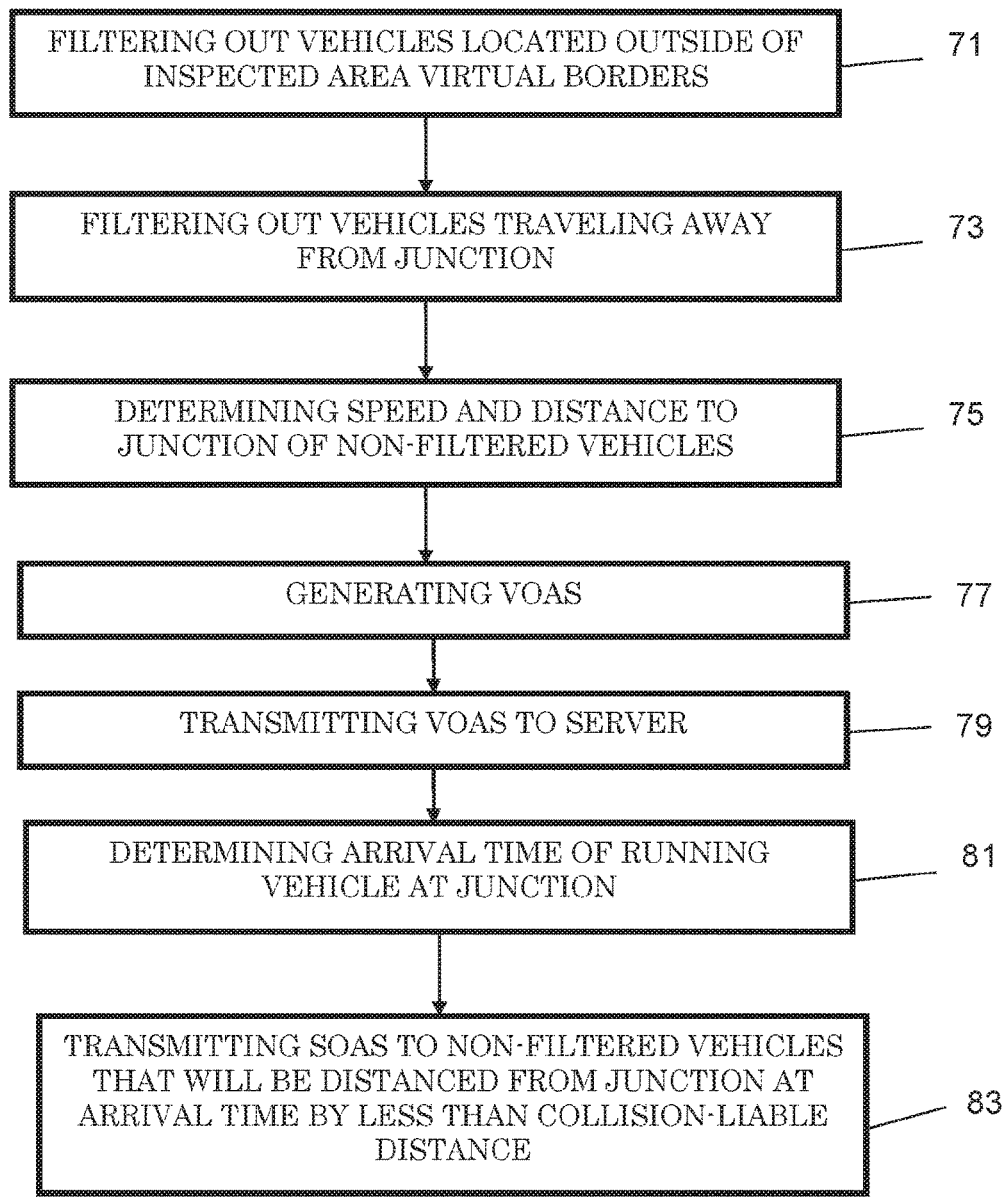
FIG. 5 is flow chart of a method for determining to which vehicles an alert signal should be transmitted, according to an embodiment of the invention.

FIG. 5 illustrates a method for determining to which vehicles an alert signal for assisting in minimizing or avoiding the impact of a collision with a running vehicle should be transmitted. The server first filters out in step 71 all vehicle-related location data that is not associated with the virtual borders of a given inspected area, which are defined by the map data and are preferably predetermined offline. The virtual borders may define a minimum distance to an adjacent downstream junction that enables a vehicle traveling at a predetermined slow speed to arrive at the junction area within a predetermined time duration and be endangered by a running vehicle. The server then filters out in step 73 all vehicles that are traveling away from the junction area.

The instantaneous speed and distance from the junction area of the remaining non-filtered vehicles are constantly determined by the server in step 75. When a vehicle unit generates an alert signal in step 77 indicating that the non-filtered vehicle in which it is mounted is spaced from the junction area by a distance that is shorter than the threshold safe braking distance and therefore should be considered a running vehicle, the alert signal is automatically transmitted to the server in step 79. After receiving a vehicle-originated alert signal, the server determines in step 81 the estimated time at which the running vehicle will arrive at the junction area. The server then retransmits the alert signal, or transmits a server-generated alert signal by means of processor-activated alert circuitry, in step 83, such that the server-originated alert signal is transmitted to all non-filtered vehicles that will be distanced from the junction area at the estimated arrival time, as calculated based on their instantaneous speed and location, by less than a predetermined distance that is indicative that they are liable to collide with the running vehicle. The server may also transmit the alert signal to all vehicles that are immediately behind a vehicle that is in risk of colliding with the running vehicle.

In order to minimize the risk of a collision between a vehicle that is to receive the server-originated alert signal (hereinafter "receiving vehicle") and neighboring vehicles due to the emergency nature of the received alert signal and the resulting sudden braking force by the driver of the receiving vehicle, the server may transmit the SOAS to a receiving vehicle at a predetermined time prior to the estimated arrival time of the running vehicle, so that the receiving vehicle would not be forced to apply a sudden braking force. A suitable range of time for the SOAS to be received by the receiving vehicle may be 5-10 seconds prior to the estimated arrival time of the running vehicle at the junction area, to afford the driver sufficient reaction time to apply a braking force without endangering neighboring vehicles. The server may transmit a different SOAS to various vehicles, depending on the relative location of the receiving vehicle with respect to the running vehicle, so that the corresponding visual alert may display a "RUNNING VEHICLE TO THE RIGHT" warning following server determination that the running vehicle is liable to collide with the receiving vehicle at the specified side thereof.

In another embodiment of the invention, the remote server continuously or intermittently receives captured images, which are automatically transmitted thereto from the forwardly directed optical sensor, such as illustrated in FIG. 1, mounted on all vehicles in the vicinity of the inspected area, generally those vehicles that have not been filtered out in steps 71 and 73 of FIG. 5. The optical sensor may be a smartphone that is mounted on the front window of the vehicles in the vicinity of the inspected area and that is provided with a dedicated application running on a processor thereof, which initiates transmission of images to the server. A vehicle unit may compress the captured images prior to transmission to the server. Alternatively for increased speed in transmission, the captured images may be of reduced resolution, since only a change in traffic light spot color or relative position has to be discerned. An image processing unit housed in the server will analyze the received images and changes in the location of vehicles, to identify risky scenarios of impending collisions.

Figure 6:
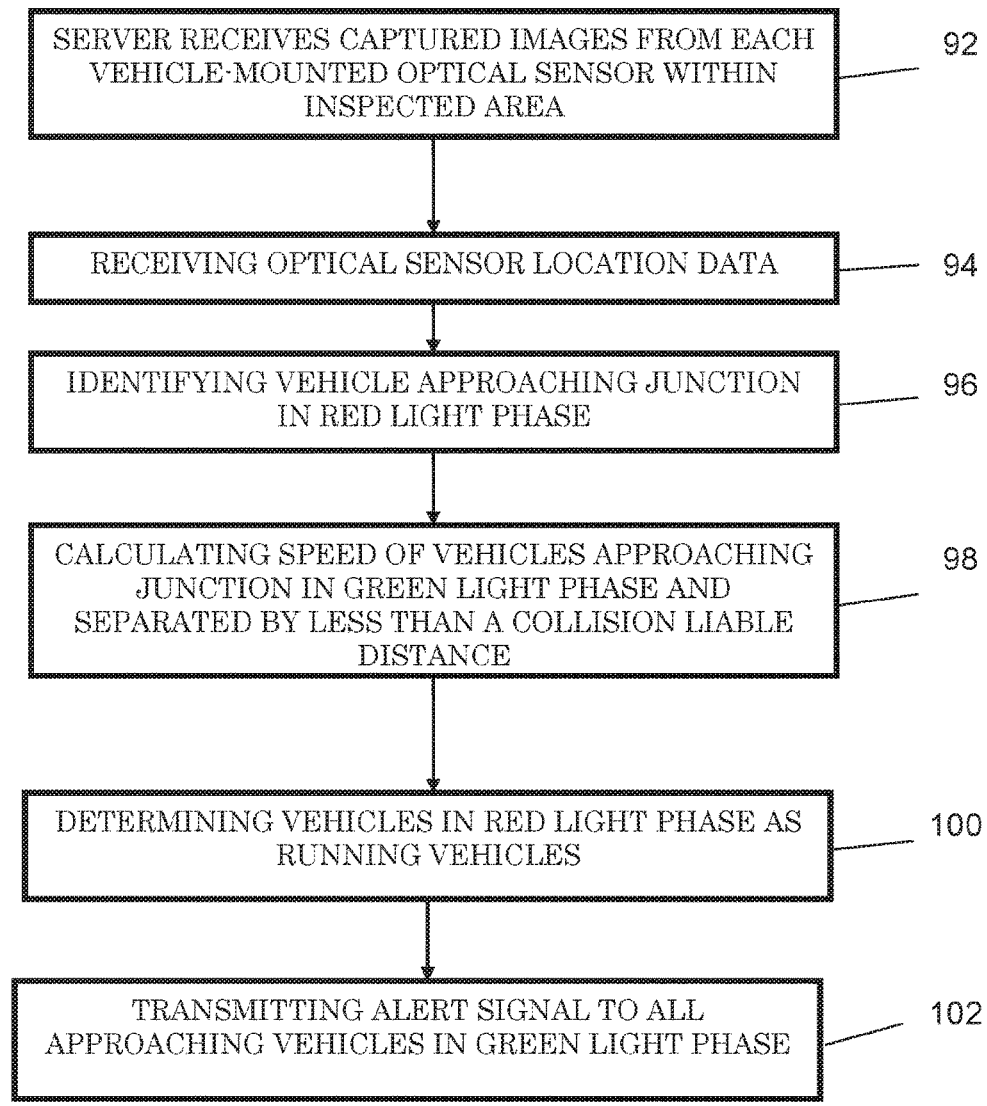
FIG. 6 is flow chart of a method for determining that a vehicle is considered as a running vehicle, according to an embodiment of the invention.

As shown in FIG. 6, the remote server receives captured images in step 92 from e.g. four smartphones that are installed on four different vehicles, respectively, approaching a road junction with traffic lights. At the same time, the remote server receives location data in step 94 associated with the four smartphones from the cellular network or directly from the smartphones. At step 96, the remote server identifies those vehicles by image processing which are approaching the junction via lanes in a red light phase and which should normally reduce their speed to stop before the stop line. At step 98, the remote server calculates the speed of the other vehicles which are approaching the junction in a green light phase from a different direction and are separated from the junction by less than the predetermined collision-liable distance.

Upon determining in step 100 that one or more vehicles advancing in the red light phase should be considered to be running vehicles since they did not satisfactorily decelerate and therefore will not be able to timely stop before a vehicle advancing in the green light phase will enter the junction, the remote server decides that a collision is unavoidable and transmits an alert signal in step 102 to the vehicle units of all approaching vehicles in the green light phase that there is a risk of impending collision with a running vehicle. This way, the drivers of other vehicles will be able to try avoiding a collision such as by braking or changing lanes.

Figure 7:
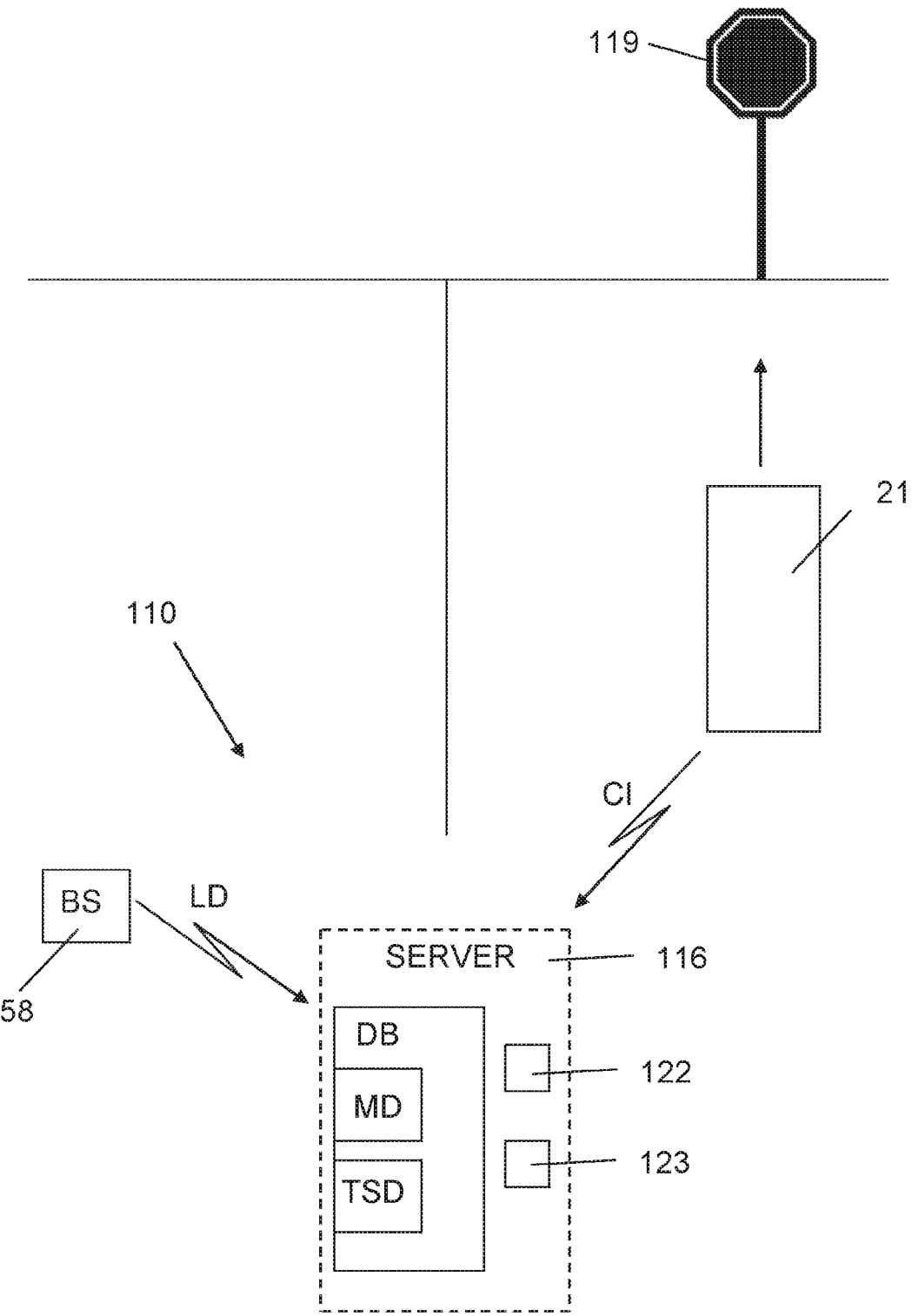
FIG. 7 is a schematic illustration of an alerting system according to another embodiment of the invention.

According to another embodiment illustrated in FIG. 7, alerting system 110 is configured to detect scenarios when the driver of a vehicle 21 ignores traffic signs (such as a stop sign 119) and provides an alert signal to other vehicles in the vicinity. In addition to accessing location data (LD) from one or base stations 58 concerning vehicles in the vicinity of an inspected area, server 116 comprises a database (DB) 117 in which map data (MD) of a plurality of inspected areas and traffic sign data (TSD) of those inspected areas is stored. The TSD includes images of all known traffic signs. Server 116 also comprises an image processing unit 122, which may include components illustrated in FIG. 2 or other components well known to those skilled in the art, in order to process images received from a vehicle-mounted optical sensor by a transmitted captured image (CI) signal and an alert signal generating unit 123. Image processing unit 122 is adapted to compare the received captured images with the stored TSD images. If image processing unit 122 determines that a CI is representative of a traffic sign according to stored instructions, the processor of alert signal generating unit 123 determines the instantaneous speed and distance to the closest downstream junction of vehicle 21, based on the LD and MD. If this distance is found to be a collision-liable distance, alert signal generating unit 123 is commanded to generate an alert signal by means of processor-activated alert circuitry and to transmit the same to drivers of other vehicles in the vicinity of vehicle 21, in a similar manner as described hereinabove with respect to a vehicle that has run a red light.

Alternatively, if the traffic sign, such as a curve sign, is deployed at a distant from a junction, the processor of alert signal generating unit 123 determines the instantaneous speed and direction, based on the LD and MD. If the instantaneous speed and direction are found to be collision-liable as a result of not being able to safely remain in a current lane, server 116 will consider vehicle 21 to be a running vehicle and alert signal generating unit 123 is commanded to generate an alert signal and to transmit the same to drivers of other vehicles in the vicinity of vehicle 21.

The identification of a traffic sign by means of a captured image is advantageous in that a traffic sign may be temporarily positioned, for example during construction work, at a location that is unknown to DB 117 or to a database of any other public authority, and therefore only system 110 is capable of alerting other drivers after a vehicle has been found to run the temporarily positioned traffic sign.

According to another embodiment, an alerting system may include Artificial Intelligence techniques such as Artificial Neural Networks (ANNs) which are a family of models inspired by biological neural networks (the central nervous systems of animals, in particular the brain) and are used to estimate or approximate functions that can depend on a large number of inputs and are generally unknown and deep machine learning algorithms (on a set of algorithms that attempt to model high-level abstractions in data by using multiple processing layers, with complex structures or otherwise, composed of multiple non-linear transformations) for improving the identification of the status of traffic lights. The use of ANNs enable a computer to "learn" from observational data, in order to be able to identify various objects after the learning phase. In the context of the present invention, several images of a specified object (traffic signs or lights, children, bikes, etc.) are input to the network, and the machine "learns" to identify these different objects, which are input to the system in various postures.

Other Artificial Intelligence techniques include Deep Learning (Deep learning is an aspect of artificial intelligence that is concerned with emulating the learning approach that human beings use to gain certain types of knowledge) or Machine Learning (Machine learning is a type of artificial intelligence that provides computers with the ability to learn without being explicitly programmed) use algorithms to build analytical models for computers to learn from data, and therefore, may be used for analyzing images and identify object (e.g., road signs, traffic lights) and states (e.g., which light of a traffic light is illuminating).

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

The invention claimed is:

1. A running vehicle alerting system, comprising:
a) a plurality of cellular-assisted and location-indicative vehicle units carried by a different one of a plurality of vehicles;
b) one or more forwardly directed optical sensors mounted on a same vehicle which are configured to capture road-related images;
c) an image processing unit configured to analyze said captured roadrelated images in real time and to determine, based on said analyzed images, whether the vehicle on which said one or more optical sensors are mounted is to be considered as a running vehicle that is spaced from a traffic light or a traffic sign by a distance shorter than a threshold safe braking distance and that is liable to endanger other vehicles;
d) an alert signal generating unit responsive to the determination of said image processing unit as a running vehicle, for generating a collision avoiding alert signal; and
e) a remote server adapted to receive each of said alert signals and location data of each of said vehicle units, said server comprising a database in which map data representative of a physical layout of a plurality of inspected areas is stored,
wherein said server is operable to process the map data and the received location data of vehicle units for a given inspected area and to determine, for each of the vehicles located within said given inspected area, an instantaneous distance between the vehicle and the traffic light or traffic sign and an instantaneous vehicular speed, and a decision as to whether it is separated from said running vehicle by less than a collision-liable distance,
wherein said server is operable to transmit an additional alert signal, based on the processed map data and location data, to the vehicles found to be separated from said running vehicle by less than a collision liable distance, to indicate to each driver thereof that a braking force must be urgently applied or that any other evasive action must be taken.

2. The system according to claim 1, wherein the image processing unit and the alert signal generating unit are locally mounted on the running vehicle and the signal generated by the image processing unit is a vehicle originated alert signal.

3. The system according to claim 2, wherein the image processing unit is configured to estimate an instantaneous distance between the vehicle and the traffic light or traffic sign by comparing the size of the traffic light or traffic sign to stored templates, each of which reflecting the size of the traffic light or traffic sign at a known distance, and determining a size reduction or enlargement.

4. The system according to claim 2, wherein the alert signal generated by the image processing unit is a driver-receptive sensory alert to indicate to a driver of the running vehicle that a braking force must be urgently applied.

5. The system according to claim 4, wherein the driver-receptive sensory alert is a visual alert or an audible alert.

6. The system according to claim 5, wherein the alert signal generating unit comprises a controller and a digital projector in communication with said controller, said projector configured to cause a predetermined message that is stored in a memory device of said controller and constituting the visual alert to be displayed.

7. The system according to claim 6, wherein the projector is configured to project an image of the predetermined message onto a dashboard, a front window of the vehicle, or a vehicle-mounted media screen.

8. The system according to claim 2, wherein the remote server is configured with a server-mounted alert signal generating unit, the remote server being in data communication with the alert signal generating unit of the running vehicle and with a receiver of each of a plurality of another vehicles, wherein the vehicle-originated alert signal is transmittable from the running vehicle to the server following determination of the vehicle as a running vehicle, whereupon a server-originated alert signal is transmittable from said server to one or more additional vehicles found to be separated from the running vehicle by less than a collision-liable distance.

9. The system according to claim 1, wherein the image processing unit is configured to estimate an instantaneous distance between the vehicle and the traffic light or traffic sign in response to analysis of pixels of the captured road-related images.

10. The system according to claim 9, wherein the image processing unit is configured to determine a state of the traffic light based on the analyzed images, the threshold safe braking distance also being a function of the determined traffic light state.

11. The system according to claim 1, wherein the alert signal generating unit comprises a signal generator, a transmitter in data communication with said signal generator for transmitting the alert signal to a receiver of another vehicle which is in transmission range of said transmitter, to indicate to the driver thereof that a braking force must be urgently applied.

12. The system according to claim 11, wherein the alert signal is transmitted from the transmitter using a short-range communication format.

13. The system according to claim 11, wherein the alert signal is receivable by a smartphone of the driver of said another vehicle.

14. The system according to claim 1, wherein the image processing unit and the alert signal generating unit are mounted on the server.

15. The system according to claim 1, further comprising one or more cellular base stations operable to transmit location data of the plurality of cellularassisted units to the server.

16. The system according to claim 1, wherein the inspected area is selected from the group consisting of an area that includes a traffic light, an area that includes a traffic sign, an area that includes a stop line, an area that includes all lanes leading to a stop line, an area that includes a junction area delimited by all adjacent stop lines, and an area that includes a railroad crossing.

17. The system according to claim 1, wherein each of the vehicle units is built in to the corresponding vehicle by which it is carried.

18. The system according to claim 1, wherein the one or more optical sensors include two two-dimensional optical sensors with overlapping fields of view, wherein the image processing unit is configured to analyze the road-related images captured by said two optical sensors and to output effective three-dimensional data, based on image analysis of the overlapping fields of view.

19. The system according to claim 1, wherein the one or more optical sensors or the image processing unit are implemented by a smartphone.

20. A method for alerting neighboring vehicles following identification of a running vehicle, comprising the steps of:
 a) providing a database in which map data for a given inspected area is stored;
 b) capturing road-related images by one or more forwardly directed optical sensors mounted on a same vehicle;
 c) by an image processing unit in data communication with said one or more optical sensors, analyzing the captured road-related images in real time to identify a traffic light or a traffic sign located within said given inspected area and being approached by said vehicle;
 d) transmitting location data of a plurality of cellular-assisted and location-indicative vehicle units, carried by a different one of a plurality of vehicles which are located within said given inspected area, to a processor in data communication with said image processing unit and with said database;
 e) determining, by said processor, an instantaneous distance between said vehicle and the identified traffic light or traffic sign and an instantaneous vehicular speed, and a decision as to whether said vehicle should be considered as a running vehicle that is spaced from the identified traffic light or traffic sign by a distance shorter than a threshold safe braking distance and that is liable to endanger other vehicles, the threshold safe braking distance being a function of said instantaneous distance and said instantaneous speed;
 f) determining, by said processor, which of said plurality of vehicles is found to be separated from said running vehicle by less than a collision-liable distance; and
 g) if said vehicle has been determined to be a running vehicle, transmitting a wireless alert signal to a receiver of each of said plurality of vehicles found to be separated from said running vehicle by less than a collision-liable distance, to indicate to a driver of each of said plurality of vehicles found to be separated from said running vehicle by less than a collision-liable distance that a braking force must be urgently applied or that any other evasive action must be taken.

21. The method according to claim 20, wherein a remote server determines a location of each of the plurality of vehicles which are located within the given inspected area and transmits the alert signal to each of the plurality of vehicles found to be separated from said running vehicle by less than a collision-liable distance.

22. The method according to claim 20, wherein the image processing unit uses Artificial Intelligence techniques to identify traffic lights or traffic signs.

* * * * *